United States Patent

[11] 3,600,738

| [72] | Inventors | William C. Riester<br>Williamsville;<br>Raymond A. Deibel, West Falls, both of, N.Y. |
|---|---|---|
| [21] | Appl. No. | 14,112 |
| [22] | Filed | Feb. 25, 1970 |
| [45] | Patented | Aug. 24, 1971 |
| [73] | Assignee | Trico Products Corporation<br>Buffalo, N.Y.<br>Continuation-in-part of application Ser. No. 747,763, July 5, 1968, now Patent No. 3,512,205. |

[54] WINDSHIELD WIPER ARM
6 Claims, 8 Drawing Figs.

| [52] | U.S. Cl. | 15/250.34 |
|---|---|---|
| [51] | Int. Cl. | B60s 1/04 |
| [50] | Field of Search | 15/250.34, 250.35 |

[56] References Cited
UNITED STATES PATENTS

| 2,994,900 | 8/1961 | Smithers | 15/250.34 |
|---|---|---|---|
| 3,126,216 | 3/1964 | Krohm | 15/250.34 X |
| 3,344,458 | 10/1967 | Deibel et al. | 15/250.35 |

*Primary Examiner*—Peter Feldman
*Attorney*—E. Herbert Liss

ABSTRACT: A windshield wiper arm includes a mounting head having a mounting head cover or retainer enveloping the mounting head and pivoted thereto. The retainer may be pivoted to the mounting head with portions of its sidewalls straddling the mounting head. A pair of compression springs recessed in the mounting head bear against the web of the mounting head cover to urge the arm against a windshield of a motor vehicle. Alternatively, an exposed mounting head may be employed wherein a tension spring spans the pivotal connection. A recess in the mounting head receives a pivot shaft drive burr in driving engagement. A latch pivoted to the arm head engages the edge of one flange of the mounting head cover in the installation position. In the latching position the latch underlies the drive burr to retain it in the recess. Additional forms of latches comprise a lever transversely slidable on the mounting head, manually slidable to a position where a portion engages either a longitudinal edge or an edge at the end of the flange of the arm head cover member or retainer to maintain the arm in an installation attitude. In the latching position a portion of the lever underlies the drive burr retaining it in the drive burr recess of the mounting head.

Patented Aug. 24, 1971

INVENTOR.
WILLIAM C. RIESTER and
RAYMOND A. DEIBEL
BY

E. Herbert Liss
ATTORNEY.

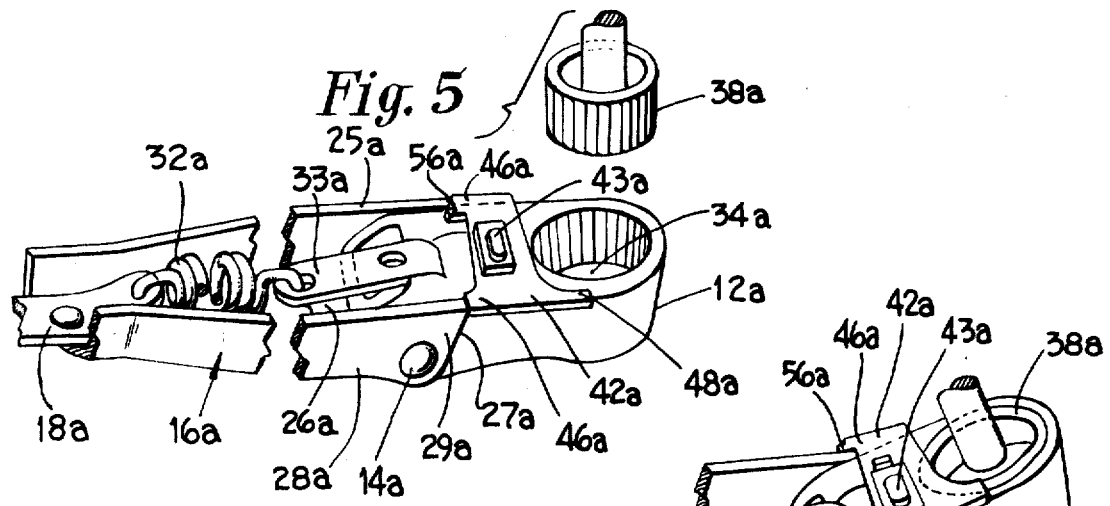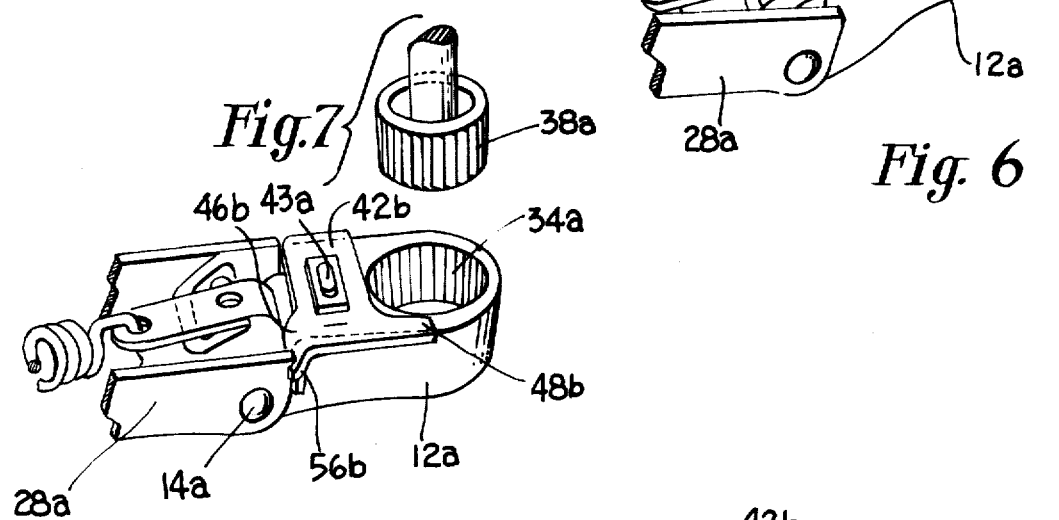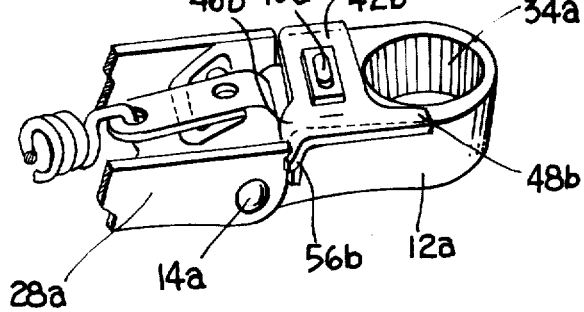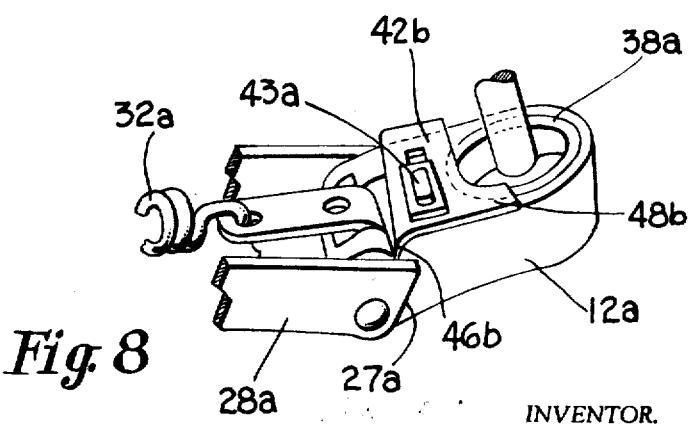

WINDSHIELD WIPER ARM

This is a continuation-in-part of copending application Ser. No. 747,763, filed July 53 1968, now U.S. Pat. No. 3,512,205.

BACK OF THE INVENTION

The present invention relates to windshield wiper arms and more particularly to an improved arm-to-shaft connection.

Present conventional wiper arms are retained on the pivot shaft drive burr by a flat spring latch as, for example, that disclosed in U.S. Pat. No. 2,564,819 by G. Shieberl, issued Aug. 21, 1951 and also in U.S. Pat. No. 3,344,458 issued on Oct. 3, 1967 to R. A. Deibel et al. The flat spring latch of the type shown in the above-mentioned patents provides excellent arm retention characteristics. However, the improved construction of the present invention facilitates installation and also removal and replacement. For installation purposes it is necessary to maintain the arm in an installation attitude against the force of the arm-biasing means. This force may be as much as 40 lbs. in some instances, necessitating the use of a special tool. The arm shown in the above-mentioned U.S. Pat. No. 3,344,458 issued on Oct. 3, 1967 to R. A. Deibel et al. The flat spring latch of the type shown in the above-mentioned patents provides excellent arm retention characteristics. However, the improved construction of the present invention facilitates installation and also removal and replacement. For installation purposes it is necessary to maintain the arm in an installation attitude against the force of the arm-biasing means. This force may be as much as 40 lbs. in some instances, necessitating the use of a special tool. The arm shown in the above-mentioned U.S. Pat. No. 3,344,458 requires a special pin to compress the arm pressure springs for facilitating assembly, which pin is removed after assembly and must be available and reinserted to remove the arm for replacement or repair. Withdrawal of the arm from a knurled drive burr requires considerable force to overcome the flat spring type arm retention latch. Thus installation as well as removal can be awkward operations.

With the presently used spring-type arm retention latch it is also possible during installation to mount the arm on the drive burr in less than full engagement. Such incomplete installation will not be readily apparent since the biasing spring will maintain the arm in its wiping position against the windshield. During operation the arm could readily be inadvertently displaced from the pivot shaft.

SUMMARY OF THE INVENTION

The improved arm retention latch of the present invention simplifies installation removal by providing means permanently integrated with the arm for maintaining the arm in the proper attitude for installation or removal. Upon installation the latch is movable to an arm retention position. The design of the latch lever is such that if the wiper arm mounting head is not fully engaged on the knurled driver the arm cannot be released for movement to a wiping position against the windshield. Thus the latch lever serves a dual purpose in that the wiper arm must be properly installed to permit actuation of the latch lever, and the latch lever when actuated provides a positive retention of the wiper arm on the knurled driver. It further eliminates the requirement for a separate installation pin and the necessity for using an arm removal tool.

The present invention is particularly useful for wiper arms of the type disclosed in the above-mentioned U.S. Pat. No. 3,344,458 which utilizes a mounting head enveloped by a mounting head cover as well as in the type having an exposed mounting head with a tension form of arm-biasing spring. The latch lever is secured to the mounting head for movement from the installation and removal position where it bears against the edge of the arm head cover or retainer, thus maintaining a wiper arm head in a proper attitude for installation to a latching position where it engages the bottom of the knurled driver for retaining the arm on the driver.

One form of the invention employs a latch lever mounted on the underside of the mounting head for pivotal movement from the installation and removal position to the latching position.

In another form of the invention the latch lever is slidably mounted for transverse movement on the mounting head. It may be maintained in the installation and removal position bearing against an edge of the retainer sidewall or flange by a small abutment which engages the lateral surface of the retainer side wall. After placing the arm in position on the pivot shaft, the arm can be raised slightly to avoid engagement between the abutment and the sidewall of the retainer while the latch lever is moved to a latching position where it engages the bottom of the knurled driver to retain the arm on the driver.

In all embodiments the latch lever is retained in its latching position by engagement with the inner surfaces of the sidewalls of the retainer. In each form of the invention an abutment may be provided which engages an external surface of the retainer sidewall to prevent inadvertent movement of the retainer from installation and removal position to latching position during shipment and handling.

The principal object of the present invention is to provide an improved latch for retaining a windshield wiper arm on a pivot shaft which assures positive arm retention and which facilitates installation and removal.

Another object of the invention is to provide an improved latch for a windshield wiper arm assembly which assures full engagement of the arm head on the driver.

Other objects and advantages of the invention will be apparent from the following detailed description taken in conjunction with the accompanying drawings.

BRIEF DESCRIPTION OF THE DRAWINGS

FIG. 5 is a fragmentary perspective view of a modification of the invention in position for installation or removal;

FIG. 6 is a fragmentary perspective view of the modification shown in FIG. 5 in latching position;

FIG. 7 is a fragmentary perspective view, similar to FIG. 5, of a modification of the mounting head for the invention; and FIG. 8 is a fragmentary perspective view, similar to FIG. 6, of the modification shown in FIG. 7.

DETAILED DESCRIPTION

Figure 1:
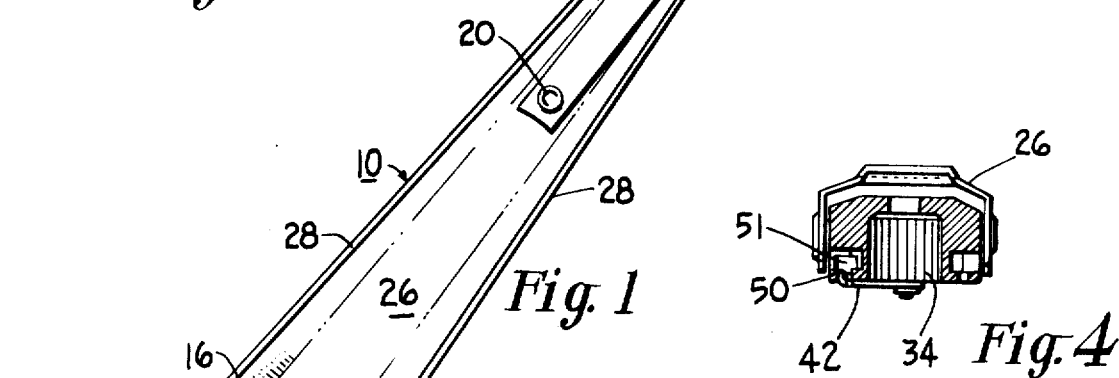
FIG. 1 is a bottom elevational view of the wiper arm of this invention.
Figure 4:
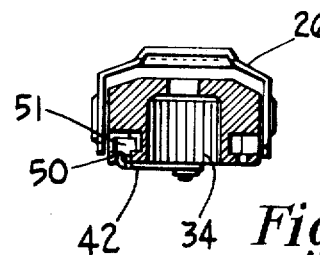
FIG. 4 is a fragmentary sectional view taken on line IV–IV of FIG. 1.

FIG. 1 illustrates a wiper arm 10 having a mounting head 12 pivoted on a transverse pivot pin 14 to an arm retainer or mounting head cover member 16. A blade-carrying arm extension 18 is secured to the outer end of the arm retainer 16 in any suitable manner as for example by riveting as at 20 and crimping as at 22. The arm extension 18 includes means 24 at its free end for securing a wiper blade (not shown) thereto. The mounting head cover 16 may be of substantially channel shaped configuration having a web portion 26 converging toward its outer end and legs or sidewalls 28 inclined toward the outer end.

The mounting head includes a pair of recesses 30 in which are seated compression springs 32 which constitute arm biasing means. The springs 32 bear against web 26 of the arm head cover. A driver or pivot shaft receiving recess 34 having a serrated inner surface is provided for receiving a pivot shaft 36 having a drive burr or driver 38 knurled or serrated as at 40 on its lateral periphery. The serrations 40 of the drive burr 38 mate with the serrations on the inner surface of recess 34 to provide a driving engagement. The mounting head 12 has an opening transversely therethrough intermediate the spring recesses 30 and the pivoting shaft retaining recesses 34 for journaling pivot pin 14 which extends through aligned openings in the sidewalls 28 of the retainer 26.

In the modification shown in FIGS. 1, 2, 3 and 4 the mounting head 12 has a latch lever 42 pivoted thereto on an axis 44. The latch lever is stepped to include a portion 46 at its free end and a portion 48 adjacent to its pivotal end. A lug 50 depends from the surface 48 and has a transverse portion 51 at its free end which engages in a tee slot 52 formed in the mounting head 12. The tee slot 52 limits the pivotal movement of the latch lever 42 between its two end positions. Engagement of transverse portion 51 in tee slot 52 relieves the stress on the pivotal connection at 44 when the arm assembly is in the installation and removal position. A slot 54 is provided in the mounting head 12 for receiving the portion 46 of a lever 42.

Figure 2:
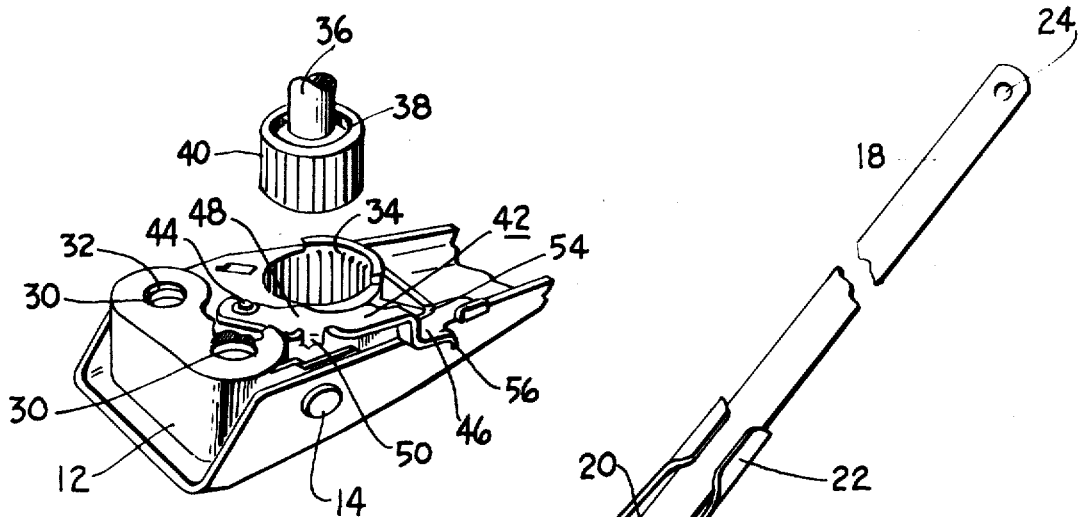
FIG. 2 is a fragmentary perspective view of the wiper arm partially exploded.
Figure 3:
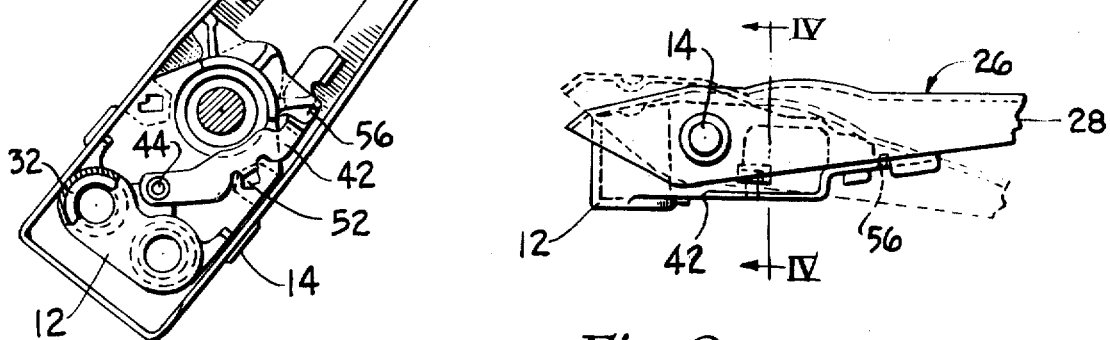
FIG. 3 is a fragmentary side elevational view of the wiper arm of this invention in its installation attitude showing its installed position in dotted lines.

The wiper arm assembly as shipped will have the lever in the installation attitude as shown in FIG. 2 and in solid lines in FIG. 3. The portion 46 of a lever 42 will bear against the longitudinal edge of the sidewall 28 of the retainer 26 maintaining the wiper arm in the installation and removal attitude. In this position the recess 34 is open to receive the drive burr 38. A projection 56 forming a stop or abutment may be struck out from a lateral surface of latch lever 42. The stop or abutment engages the external lateral surface of sidewall 28 when the latch lever is in installation or removal position. This prevents inadvertent movement of the latch lever to latched position in case of bumping during shipping, installation or removal.

The lever 42 will maintain the arm in a position displaced outwardly with the attached blade spaced from the windshield of a motor vehicle until the lever 42 is manually pivoted into the lock position with the portion 48 underlying the drive burr 38 and the portion 46 contained in the slot 54. When the latch is in the latching position the arm is released and free to assume a position urging the blades against the windshield as shown in dotted lines in FIG. 3 and in FIG. 1. The sidewall 28 conceals and retains the latching lever in its latched position. In the event that the drive burr 38 is not in full engagement in the recesses 34, the latch lever 42 cannot be moved to its locking position because the edge of portion 48 will engage the lateral periphery of the drive burr 38, thereby restraining its inward movement. The wiper blade in this attitude cannot engage the windshield. It will, therefore, be apparent to the installer that the installation is not proper.

If it is desired to remove the wiper arm assembly the arm is lifted until the latch lever 42 and abutment 56 are clear of the retainer sidewall 28. Manual rotation of the latch lever to the installation and removal position disengages it from the bottom of the knurled driver 38. The lock lever 42 again bears against the edge of the retainer sidewall 28 maintaining the wiper arm in the proper attitude for removal as shown by full lines in FIG. 3.

A modification of the invention is shown in FIGS. 5 and 6 embodied in a different type of wiper arm assembly. A mounting head 12a includes a cylindrical recess 34a having a serrated inner surface for receiving a drive burr 38a having on its outer surface serrations complementary to the serrations in the recess 34a. A spring retainer 16a includes a top wall or web 26a and depending sidewalls 28a having ears 29a extending from each sidewall and straddling a portion of the mounting head 12a. The sidewalls 28a include longitudinal edges 25a and edges 27a on ears 29a at their ends adjacent the mounting head 12a. Mounting head 12a is pivotally secured to retainer 16a on a transverse axis. Pivot pin 14a extends through aligned apertures in ears 29a and a transverse opening through mounting head 12a. A tension spring 32a is provided for biasing the retainer 16a and arm extension 18a toward an associated windshield on an axis through pivot pin 14a. The spring 32a is connected at one end to an apertured end portion of arm extension 18a and at its other end to a strap 33a anchored at mounting head 14a.

A latch lever 42a of flat stock is mounted for transverse slidable movement at the underside of mounting head 12a on a boss 43a between an installation and removal position (FIG. 5) and a latching position (FIG. 6). The latch lever 42a includes an extending portion 48a which overlies the recess 34a when the latch lever is in latched position. A pair of extending portions 46a are provided which engage the edge 27a at the ends of sidewalls 28a when in installation and removal position to retain the arm in an installation attitude against the bias of spring 32a. A projection or abutment 56a is provided on one of the extending portions 46a to bear against the internal lateral surface of a sidewall 28a when the latch lever 42a is in installation and removal position to prevent inadvertent displacement to the latched position. It is of course apparent that in accordance with the broader aspects of the invention the extending portions 46a could bear on the longitudinal edge of sidewalls 28a and that if a projection or abutment 56a is disposed on the other tab (FIGS. 5 and 6) it could be positioned to bear on the outer lateral surface of sidewalls 28a. It should be noted that when latch lever 42a is in installation and removal position extension 48a is clear of recess 34a to permit insertion of drive burr 38a.

Another modification of the invention is illustrated in FIGS. 7 and 8. It differs from the modification shown in FIGS. 5 and 6 only in the details of the latch lever. Latch lever 42b includes a downturned tab 46b in lieu of the extending portions 46a and an abutment or projection 56b struck up from abutment 46b. The abutment 56b engages an external lateral surface of sidewall 28a when in installation and removal position (FIG. 7) to prevent inadvertent displacement to latching position. The latch lever 42b is slidably mounted on lug 43a for transverse movement between an installation and removal position (FIG. 7) where the surface of tab 46b bears against the edge 27a at the end of sidewall 28a of retainer 16a while extending portion 48b clears recess 34a and a latching position (FIG. 8) where tab 46b clears edge 27a of a sidewall 28a and extending portion 48b overlies recess 34a to retain drive burr 38a in position.

It should now be apparent that a unique mounting head latch lever has been provided for positively retaining the arm on the drive burr, for maintaining the arm in the proper attitude for installation and removal, and for insuring that the drive burr will be properly and fully engaged in the mounting head recess during assembly. Certain specific embodiments and modifications of the invention have been described for the purpose of illustration but it will be apparent that various modifications and other embodiments are possible within the scope of the invention. It is to be understood, therefore, that the invention is not limited to the specific arrangements shown but in its broadest aspect it includes all equivalent embodiments and modifications which come within the scope of the invention.

What is claimed is:

1. A windshield wiper arm assembly for mounting on a pivot shaft assembly including a drive burr, said arm assembly including a mounting head, a mounting head retainer including sidewalls, and having a portion straddling a portion of said mounting head, said mounting head and mounting head retainer being hingedly connected together about a transverse pivot pin, means for securing a wiper blade to said arm assembly at its end remote from said mounting head, means for securing said mounting head to said pivot shaft assembly, biasing means acting between said retainer and said mounting head about said transverse pivot pin for transmitting wiping pressure to a wiper blade through said wiper arm, a latch lever located at said mounting head movable from an installation and removal position extending from said mounting head and having a portion bearing on an edge of a sidewall of said mounting head retainer to thereby overcome the biasing means while clearing said recess to a latching position having a portion overlying the bottom end of said drive burr to thereby retain said drive burr in said recess while clearing the retainer for movement to an operative position, said latch lever including abutment means engageable with a lateral surface of the sidewall of said mounting head retainer when in installation and removal position whereby inadvertent release of said retainer is prevented.

2. A combination according to claim 1 wherein said latch lever is mounted for pivotal movement relative to said mounting head.

3. A combination according to claim 1 wherein said latch lever is slidably mounted for transverse movement relative to said mounting head.

4. A combination according to claim 1 wherein said latch lever includes a portion engageable with a longitudinal edge of said sidewall of said mounting head retainer when in installation and removal position.

5. A combination according to claim 3 wherein said latch lever includes a portion bearing against an edge of sidewall of said mounting head retainer on an end thereof when in installation and removal position.

6. A combination according to claim 5 wherein said portion comprises a tab having a lateral surface bearing against said edge of said sidewall of said mounting head retainer at an end thereof.

UNITED STATES PATENT OFFICE
CERTIFICATE OF CORRECTION

Patent No. 3,600,738          Dated August 24, 1971

Inventor(s)      William C. Riester and Raymond A. Deibel

It is certified that error appears in the above-identified patent and that said Letters Patent are hereby corrected as shown below:

Column 1, line 6, change "BACK OF THE INVENTION" to --BACKGROUND OF THE INVENTION--.
   Column 2, line 45, change "1" to --3--.
   Column 3, line 53, change "lock" to --latch--; line 63, change "26a" to --36a--; line 75, change "14a" to --12a--.

Signed and sealed this 21st day of March 1972.

(SEAL)
Attest:

EDWARD M. FLETCHER, JR.          ROBERT GOTTSCHALK
Attesting Officer                   Commissioner of Patents